United States Patent [19]

Knoplioch et al.

[11] Patent Number: 5,412,763

[45] Date of Patent: May 2, 1995

[54] METHOD FOR DISPLAYING AN IMAGE OF A PORTION OF THE INSIDE OF A THREE-DIMENSIONAL PHYSICAL STRUCTURE

[75] Inventors: Jérôme Knoplioch, Paris; Guy Prevost, Gif sur Yvette; Nicolas Treil, Saint-Cloud, all of France

[73] Assignee: General Electric CGR S.A., Issy Moulineaux, France

[21] Appl. No.: 705,646

[22] Filed: May 24, 1991

[30] Foreign Application Priority Data

May 25, 1990 [FR] France .................... 90 06513

[51] Int. Cl.$^6$ .......................................... G06F 15/62
[52] U.S. Cl. .................... 395/124; 395/119; 395/120; 364/413.13
[58] Field of Search ............... 395/119, 120, 124, 164, 395/166; 364/413.13

[56] References Cited

U.S. PATENT DOCUMENTS 4,791,567 12/1988 Cline et al. .................... 364/413.13

OTHER PUBLICATIONS

Computer Vision, Graphics, and Image Processing, vol. 48, 1989, pp. 190–216, New York, US; L.-S. Chen et al.: "Representation, display and manipulation of 3D digital scenes and their medical applications".

*Primary Examiner*—Almis Jankus
*Attorney, Agent, or Firm*—Pollock, Vande Sande & Priddy

[57] ABSTRACT

In order to display a portion of a physical structure on a screen, an intermediate "pointer" memory is created. The addresses of memory words in the pointer memory correspond to the coordinates of pixels on a display screen, or in equivalent manner to the corresponding addresses of memory words in an image memory. The information loaded into the memory words of the pointer memory is representative of addresses in an "original" memory whose collection of memory words represents the structure under investigation. It is shown that by using the pointer memory it is possible for each voxel of the structure to establish quickly the coordinates of the position at which it ought to appear on the screen, and thus the address of the corresponding memory words in the pointer memory, by using previously-calculated memory addresses for the pointer memory. It is shown that by using such previously-calculated memory addresses, the need to perform multiplications is avoided, as is the need to perform repeated accesses to the original memory. Very high speed processing is obtained in this way.

8 Claims, 4 Drawing Sheets

FIG_1

FIG_5

FIG_6

METHOD FOR DISPLAYING AN IMAGE OF A PORTION OF THE INSIDE OF A THREE-DIMENSIONAL PHYSICAL STRUCTURE

The present invention relates to a method of displaying the image of a portion of a physical structure. It is particularly suitable for use in the medical field where there is a need to show portions of images of human tissues for diagnostic purposes. A main object of the invention is to make it possible to display the structure to be shown very quickly. It relates essentially to displaying views of structures, optionally with perspective effects, so as to cause the portions of the structures shown to appear as though dissected from the bodies of patients. Given the speed with which the method makes it possible to show images of such internal structures, it is also applicable to other fields, in particular to quality control in industry.

BACKGROUND OF THE INVENTION

Various methods exist for displaying an inside portion of a structure. However, all of these methods are based on having three-dimensional knowledge of the structure to be studied. A structure is thus normally described by a collection of volume elements or "voxels", where each voxel represents firstly a position in three-dimensional space inside the structure, and secondly at least one physical magnitude value representative of the structure at this position. Depending on the fineness of the voxels, the image of the structure is said to be resolved more or less finely. In the medical field, the physical phenomenon concerned relates essentially to the mean radiological density of each voxel when the investigation includes passing a patient through a tomographic X-ray scanner. When a nuclear magnetic resonance apparatus is used, then the phenomenon relates essentially in measuring the hydrogen content of each voxel. For an ultrasonic scan, the ability of each voxel at backscanning sound waves is measured. When measurements are performed by means of a gamma camera, then it is essentially metabolic functions that are measured in conjunction with a radiographic marker. Other investigative procedures may also be considered. The invention relates to all investigative procedures that give rise to knowledge of at least one physical magnitude in each voxel of the structure.

In the image processing with which the present invention is concerned, each voxel is associated with a memory word in a memory. The memory represents the structure. The addresses of memory words in the memory correspond to the positions occupied by the voxels in three-dimensional space. The information stored in each memory word represents the value(s) of physical magnitude(s) measured at the position of the corresponding voxel. In the description below, such a memory is referred to as the "original" memory.

In order to display a portion of a structure, the first step is segmentation. Those voxels or memory words belonging to the portion of the structure to be displayed are separated from those that are not to be shown. Such segmentation may consist in sorting the memory words as a function of the value of the information stored therein. For example, if the value lies within a value window or if it is less than or greater than a threshold, then the corresponding memory word (and thus the corresponding voxel) may be considered as belonging to the portion to be displayed. In this case a binary flag is additionally associated therewith: in one example, the voxel is associated with binary value 1. Otherwise the memory word is said not to belong to the structure and its flag is given the complementary binary value: e.g., 0. A memory word is now defined by its address, the value of the physical magnitude(s) measured at the location of the corresponding voxel, and a binary flag, binary 1 or binary 0, indicating whether or not the corresponding voxel is considered as belonging to the portion to be shown of the structure.

The display operation consists of displaying the image of the structure, i.e. in scanning all of the various memory words in the original memory as a function of an observation direction. A test is made to see whether or not these memory words belong to the portion to be shown and whether or not they are situated on the surface of this portion. They are then displayed or not, as appropriate in the image. Various methods are known for performing this operation. The best known method which also has the reputation of providing the highest processing performance in real time, is the method known as being of the Octree type. An implementation of this method is described in U.S. Pat. No. 4,719,585. Once segmentation has been performed, this method proceeds with a preliminary operation of subdividing the structure into eight subassemblies each having an additional binary flag allocated thereto. This binary flag has value 1 when all of the voxels of the subassembly are taken to belong to the portion of the structure to be displayed. If none of the voxels of the subassembly belong to said portion, then the subassembly is given binary value 0. However, if the subassembly includes both types of voxels, then it is itself subdivided into eight sub-subassemblies. This procedure is continued until all of the subassemblies and sub-subassemblies in a hierarchical organization are provided with an additional binary flag taking the value 0 or 1. In some cases, this hierarchical subdivision may come down to the level of individual voxels.

Once the subdivision has been done, an investigation is performed to discover which subassemblies or sub-subassemblies are visible from a given observation point. The advantage provided by this method of hierarchical subdivision is that the addresses of the memory words corresponding to the voxels situated on the surface are known automatically. The method thus deals immediately with voxels that are visible. The voxels thus merely need to be shown in the image, taking account of the display angle. It can thus be shown in one example of an original memory comprising 256×256×88 memory words, that it is possible to extract an image of a view of a portion of the structure described in this memory in about 0.5 seconds.

However, the drawback of the method as described above is that in order to calculate display effects, it requires specially-programmed machines having large amounts of computing power. Using specially-programmed machines come down to making equipment that can never be as cheap as universal type equipment operating in the standard manner. The development of this method is thus special-purpose and expensive.

In this method as in other methods known elsewhere (ray tracing, surface listing), once it has been determined which memory word corresponds to a voxel to be shown, it is necessary to calculate the coordinates of a position on a display screen where light information is to be made visible corresponding to the physical magnitude contained in the voxel. Calculating the coordinates of positions on a screen is the same as calculating the point of intersection with a plane (the plane of the screen) of a ray going away from the selected voxel in the display direction. The general display direction is normally perpendicular to the screen. Such algebraic type calculation is per se simple. It requires the coefficients of three director lines to be calculated representing the display direction: i.e. lines which are associated with the reference axis of the object in the reference system of the screen. These coefficients then appear as multiplying coefficients in the algebraic calculation of the coordinates of the selected voxel, or, equivalently, of the address of the corresponding memory word in the original memory.

In other words, for each voxel selected for display, there are three multiplications to be performed to determine its X position on the screen, there are three multiplications to be performed to determine its Y position on the screen, and there are three additions to be performed in both cases to take account of the origin being offset. All of these calculations, and in particular the multiplications, take far too long to perform and give rise to losses of time that prevent the image being shown quickly. These losses of time can only be avoided by making special processors whose lack of flexibility is described elsewhere.

Dynamic screen methods are described in the following articles:

1. "A dynamic screen technique for shaded graphics display of slice-represented objects", R. Anthony Reynolds, Dan Gordon, Lih-Shyang Chen, Computer Vision, Graphics and Image Processing 38, 257–298 (1987); and
2. "Representation, display and manipulation of 3D digital scenes and their medical applications", Lih-Shyang Chen, Marc R. Sontag, Computer vision, Graphics and Image Processing 48, 190–216 (1989).

These methods proceed by projecting segments describing the object onto the screen. These dynamic screen methods consist of inserting each segment projected onto the screen as required amongst the set of segments that have already been projected. If such an insertion discovers new non-hidden pixels, these are painted with a gray level. These methods therefore do not use an intermediate memory of pointers pointing to the voxels of the object, as described below when describing the present invention. In the invention, hidden portions are eliminated by a conventional Z-buffer technique. However the advantage of the intermediate memory is to make it possible to paint the selected pixels by various techniques (in particular by using pre-calculated normals). The method described in the articles in question is constrained to use a technique of shading on the fly, which is of lower quality (cf. article 1, page 281). For performance reasons, to implement their algorithm, the authors make use of a "run length" type description similar to the "path length" description of the invention, (article 1, page 285). In this context, they cite Merrill, Updata and Trivedi (cf. the list of references in article 1).

Article 2 goes over the same ground as the first article so far as the present invention is concerned, but it describes the object by a method combining the use of a quadtree and a "run-length" description. The drawbacks of these methods are likewise excessive computation time.

An object of the invention is to remedy these drawbacks, in particular by eliminating all operations of the multiplication type and by calculating an address on the screen by making use of a previously-calculated address for another point on the screen. It is then shown that the multiplication operations required for display purposes can be reduced merely to performing additions using values known in advance, which is much simpler than performing multiplications. This technique can thus only be envisaged when scanning the original memory in a sequential scanning mode proper to the original memory. In practice, this scanning mode is one in which all the points of a line are scanned, all the lines of a plane are scanned, and all the planes of the image are scanned, one after another. This sequential type proper scanning mode in association with multiplications being made pointless already leads to a considerable saving in time. According to the invention, when using a proper scanning mode of this type, it is possible to recall previously-calculated coordinates for positions on the screen which correspond to previously studied voxels. Then, when going from one voxel to an adjacent voxel, it is possible to increment the coordinates on the screen as a function of the observation direction.

In order to recall previously-calculated addresses on the screen, it is preferable to make use of an additional memory referred to as a "pointer" memory. In this pointer memory, also referred to as the "pointer", each pointer word has an address corresponding to the coordinates of a position on the screen and contains information which corresponds to an address of an original memory word in the original memory.

When it is desired to display the image, it then becomes very simple to read all of the words in the pointer one after another so that the addresses of these words follow one another in the expected order of image elements or pixels on the screen. In other words, when making a display, each pixel along a line is read and all the lines are read one after another, simultaneously on the screen and in the pointer memory. Reading each new word in the pointer gives information concerning the address of an original memory word in the original memory. The information contained in this original memory word is then read. This information is used as the display magnitude, e.g. chrominance or luminance, so that a light point can be displayed on the screen.

In addition, in order to avoid processing all of the voxels that do not correspond to the portion of the structure that is to be displayed, the binary representation of the structure obtained during segmentation is transformed into a "path-length" representation. The purpose of this transformation is to accelerate calculation of the coordinates of positions on the screen since the calculation then concerns the projection of only those voxels that belong to the portion to be displayed.

The sole purpose of all of these operations is merely to select those voxels which are visible in the image to be displayed, i.e. those which are situated on the surface of the portion of the structure to be displayed. A subsequent shading operation, identical to prior art shading operations, is then used to process the visible points to take account of the observation direction. Various types of shading technique can be used, e.g. the type described in "Image quality in voxel base surface shading", A. Pommert, U. Tiede, G. Wiebecke, K. H. Hohne, Proceedings CAR '89, page 737, Springer-Verlag.

SUMMARY OF THE INVENTION

The present invention thus provides a method of displaying a portion of an image of a physical structure on a display screen.

The structure is described by a collection of volume elements or "voxels" each voxel being representative firstly of a position in three-dimensional space, and secondly of the value of at least one physical magnitude representative of the structure at said position in three dimensions.

The image of the structure is described by a collection of "original" memory words in an "original" memory in communication with the screen, each original memory word of the original memory being associated firstly with an "original" address and secondly with "original" data contained in the original memory at the original address of the word.

The addresses of the original memory words correspond to the positions of the voxels in three-dimensional space, and the original information contained in the original memory corresponds to the values of the physical magnitude.

In the method:

The original memory is scanned by addressing the original memory words in a scanning mode specific to the original memory.

Original memory words are selected containing information that corresponds to the portion to be displayed of the structure.

The address of a position on the display screen is calculated for the selected original memory words and a value of at least one display magnitude is assigned to this position in the screen.

The image generated in this way by collecting together such positions on the screen is shown on the screen.

In order to calculate the addresses of the positions on the screen, previously-calculated addresses of positions on the screen are incremented.

In order to show a refined image, an intermediate "pointer" memory is used.

BRIEF DESCRIPTION OF THE DRAWINGS

An embodiment of the invention is described by way of example with reference to the accompanying drawings, in which.

DETAILED DESCRIPTION

Figure 1:
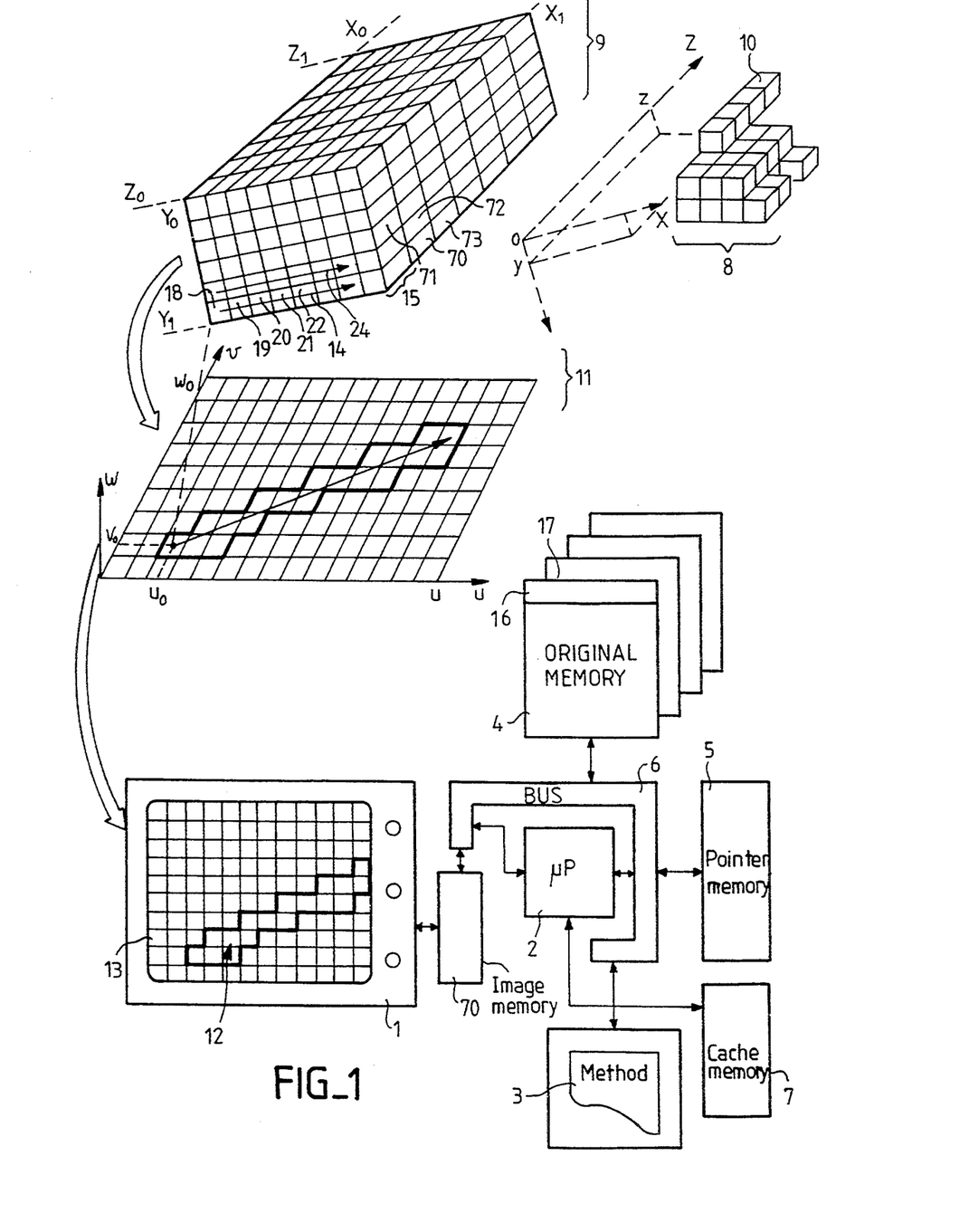
FIG. 1 is a composite representation of the various means used for implementing the method of the invention.

FIG. 1 shows the means implemented in the method of the invention. These means essentially comprise a display device or screen 1 associated with a microprocessor 2. The microprocessor 2 performs the method of the invention by executing a program 3, applying the program to data relating to the structure to be shown and contained in the planes or pages 17 of an original memory 4. During processing, the data contained in the original memory 4 is transformed to data contained in a pointer memory 5. All of these circuits are interconnected by means of a two-way connection bus 6 serving to convey both addresses and data.

As mentioned above, when using a "path-length" compressed version of the information contained in the original memory 4, the compressed information is stored in a cache memory 7 connected directly to the microprocessor 2. Such computer system architectures are known, particularly with respect to cache memories. An explanation is given, for example, in the article entitled (in translation) "Operation of cache memories: the NS32532 example" by Jean-Claude Mathod and Maurice Valentaten, published in the French Journal "Minis et Micros" No. 280, May 18, 1987. In the connection between the microprocessor 2 and the screen 1, it is conventional practice to use an image memory 7 which is naturally associated with its own special control circuits.

A portion 8 of a structure 9 is to be shown. The portion 8 of the structure 9 is constituted by a collection of voxels 10 having coordinates x,y,z in a reference axis system OXYZ. In the reference axis system, the structure is such that its coordinates all lie within respective ranges $X_0$ to $X_1$, $Y_0$ to $Y_1$, and $Z_0$ to $Z_1$. The display operation requires all of the voxels of the structure to be projected onto a plane 11 which, in the invention, has an axis system UV. This plane is perpendicular to an axis W. The axis W corresponds to the projection direction, or in other words to the viewing direction. Projecting the structure 9 onto the plane 11 requires the u,v coordinates in the plane 11 to be calculated for each of the voxels having coordinates x,y,z in the structure. In addition, each voxel projected on the plane 11 has a third coordinate w associated therewith corresponding to the distance between the plane 11 and said voxel of coordinates x,y,z. The explanation given herein is in terms of geometrical projections. However it will be understood that all such geometrical projection operations have repercussions on processing performed on the addresses of the original memory words. Such processing on the addresses can be considered as constituting projection operations.

Given the geometrical orientation and position in three dimensions of the structure 9 relative to the plane 11 the projection is equivalent to a rotation-translation operation which can be written down as follows:

TABLE ONE $$\begin{vmatrix} u \\ v \\ w \end{vmatrix} = \begin{vmatrix} ux & uy & uz \\ vx & vy & vz \\ wx & wy & wz \end{vmatrix} \begin{vmatrix} y \\ y \\ y \end{vmatrix} + \begin{vmatrix} u_0 \\ v_0 \\ w_0 \end{vmatrix}$$

With this matrix notation, the director coefficients ux, uy, uz, vx, vy, vz, wx, wy, and wz are calculated once and for all. The screen coordinates $u_O$ and $v_O$ are the coordinates of the projection of the voxel in the structure 9 whose x,y,z coordinates are 0,0,0. Furthermore, in the original memory 4, the coordinates of this point correspond to the first word in the original memory on the first row of the first page of said original memory. Any translation or rotation positioning of the structure 9 relative to the uvw frame of reference reduces to changing the coordinates $u_O$ and $v_O$. Similarly, any positioning of the image 12 on the screen 13 of the display device screen 1 (e.g. by means of a track ball or a mouse) likewise reduces to changing the values $u_O$ and $v_O$. The value $w_O$ measures the distance to within a constant between the first voxel of the structure 9 and the plane 11.

Figure 2:
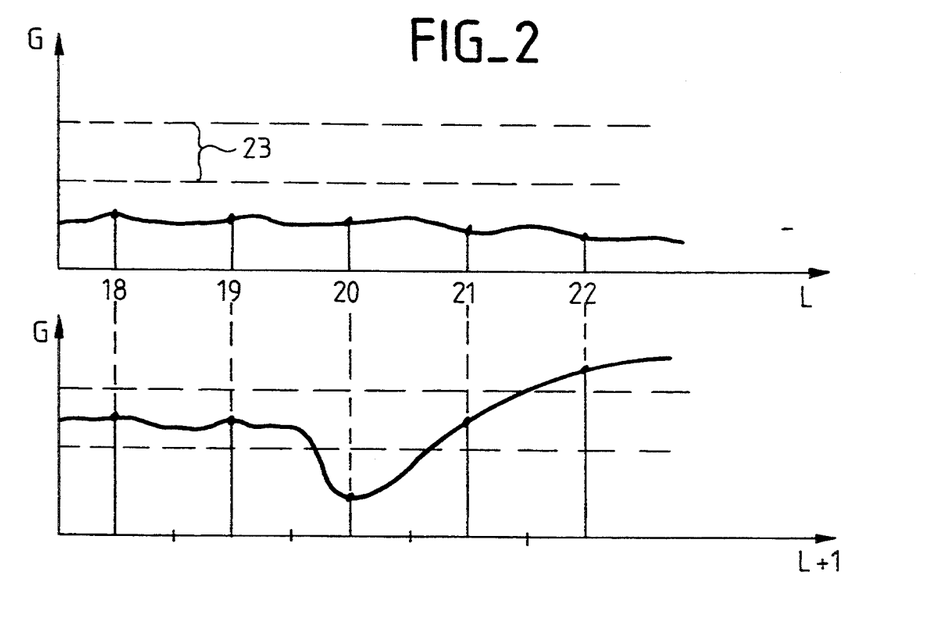
FIG. 2 represents one line of a three-dimensional image plane (equivalent to one row of a page in the original memory) as a function of the physical magnitude stored in the original memory words corresponding to said row.

FIG. 2 shows the variation in a physical magnitude G which is measured, or rather sampled, at various points along a row L passing through the structure 9. For example, the row L may correspond to the first row 14 of voxels in the first plane 15 of the structure 9 which is identical to the first row 16 of memory words in the first memory page 17 of the original memory 4. This physical magnitude G has been sampled over five voxels given respective numbers 18 to 22. It can be seen that for this row L, the physical magnitude has a value that lies outside a window 23. Consequently, it is assumed below that none of the five voxels in the row L belongs to the portion 8 to be displayed on the structure 9. In a following row L+1, e.g. corresponding to the line 24 adjacent to the row 14 in the structure 9 (and also to a corresponding "adjacent" row in the original memory 4), it can be seen that the sampled magnitude lies within the window 23 in alignment with voxels 18, 19, and 21. In binary terms, the segmentation operation consists of giving these voxels additional binary flag values of 1 while the other voxels are given the additional value 0. Such processing is conventional and the value window 23 could be replaced by observing that the physical magnitude at the location of a voxel is greater than or less than a threshold, as the case may be. It is also possible for segmentation to be based on processing a combination of a plurality of physical magnitudes.

Figure 3:
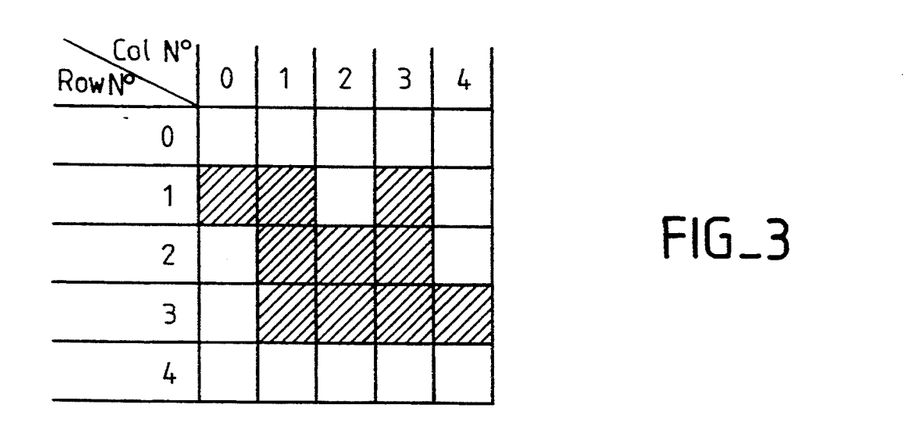
FIG. 3 is a simplified representation of a page of original memory words in the original memory.

Once the entire structure 9 has been segmented, i.e. once all of the original memory words in the original memory 4 have been given an additional binary flag value 1 or 0, each page of the memory appears as shown in FIG. 3 with respect to said binary value. FIG. 3 shows memory words in a memory page at the intersections between address rows and address columns, with the square at each intersection being blank when the corresponding word is given binary value 0, and being shaded when the corresponding word is given binary value 1. The figure shows five such rows by five such columns. In practice, the structure may be represented in the memory by pages of 256×256 memory words, or even more.

Figure 4:
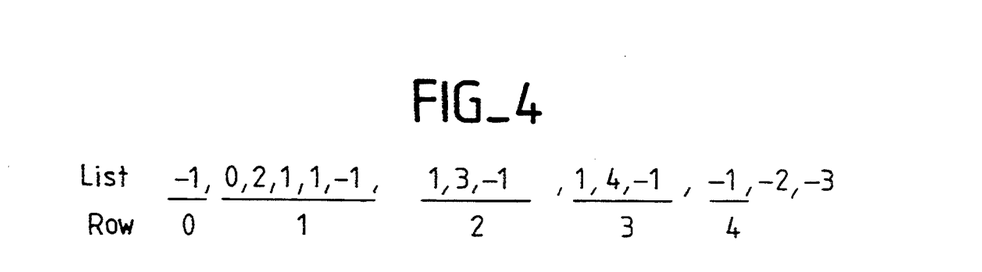
FIG. 4 is a list showing how the contents of the original memory are transformed for the purpose of compressing processing and making the contents more accessible to a cache memory for further accelerating the method of the invention.

A first compression operation which is not, a priori, essential for the invention, consists of replacing the original memory 4 as shown in FIG. 3 by a list that is easily stored in the cache memory 7 of the data processing apparatus used in the invention and as shown in FIG. 4. The list in FIG. 4 includes only 15 terms providing information both on the binary states and on the addresses of the 25 terms shown in FIG. 3, whereas FIG. 3 uses up 25 terms merely to provide information about the binary states of the original memory words.

Figure 5:
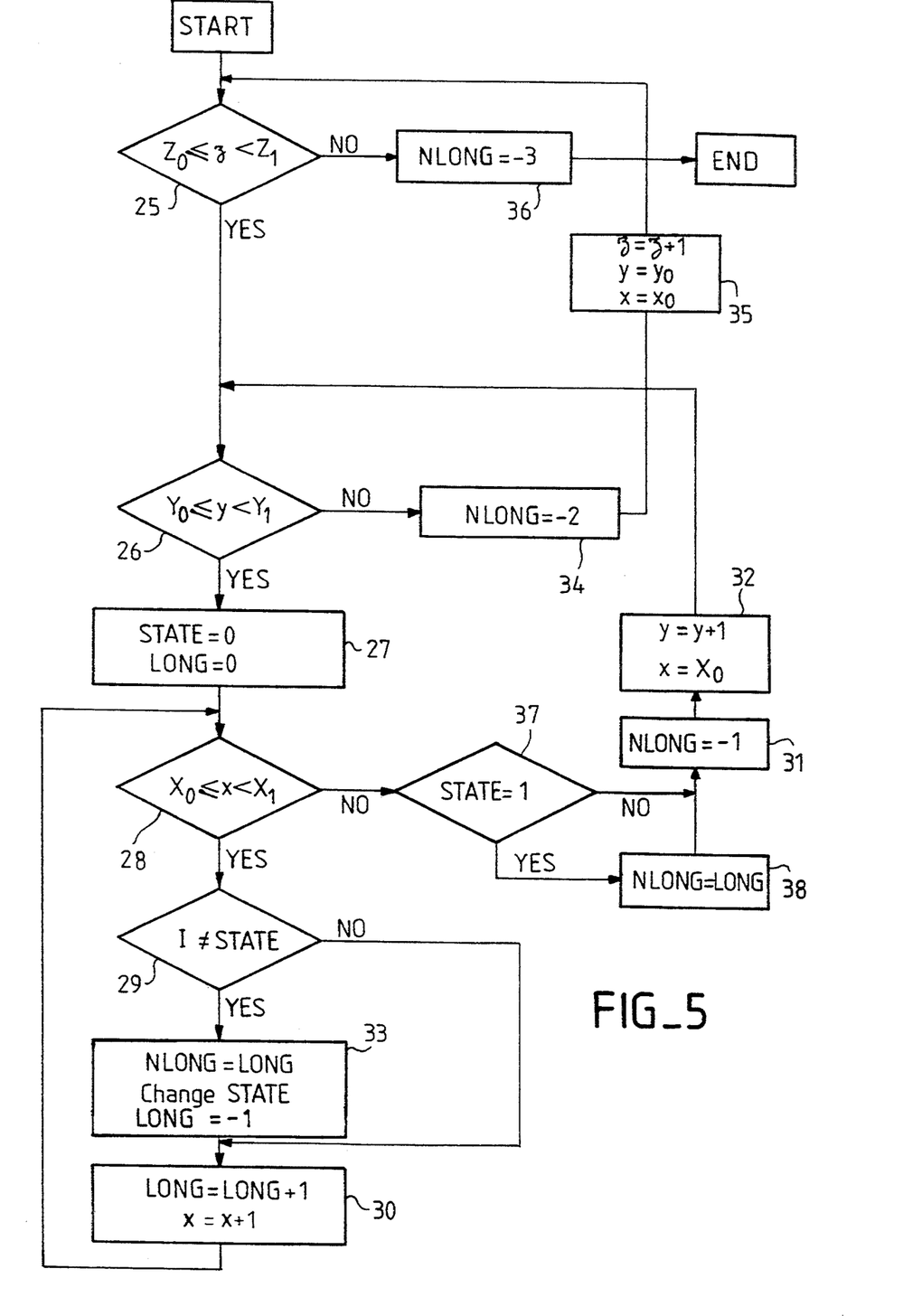
FIG. 5 is a flow chart of the algorithm used for processing the operations performed on original memory words to transform them into a list as shown in FIG. 4.

Row numbers are shown beneath the list of FIG. 4. These numbers do not form part of the list and they are shown merely to facilitate understanding how the list is structured using a path-length compression method whose algorithm is shown in FIG. 5. This algorithm is performed by the microprocessor 2 and the list is stored in the cache memory 7.

Before describing this algorithm, a particular form of encoding is specified. Naturally, the encoding could be specified differently without interfering with the generality of the invention. The encoding given herein is merely to facilitate understanding, and in particular because it also accelerates processing in a preferred implementation. Path length encoding consists in replacing the bits in a sequence by values representing the numbers of successive same-value bits in the sequence. For example, in row 0 of FIG. 3 there are five same-value bits: they are all 0. In row 2 there are first two 1 bits then a 0 bit then a 1 bit and finally a 0 bit. In row 2 there is a 0 bit followed by three 1 bits and then a 0 bit. In row 3 there is a 0 bit followed by four 1 bits. In row 4 there are five 0 bits. These sequences of bits are replaced by sequences of numbers as a function of the compression encoding scheme. This could be done, for example, by reading the rows one after another and writing: 5, 2, 1, 1, 1, 1, 3, 1, 1, 4, 5. In such a case each value change is represented by a new number.

However, in order to keep track of row changes at the end of a row (at the end of 5 bits in this example, or at the end of 256 or 512 bits in practice), and also of the end of scanning a complete plane or page of memory, and indeed to keep track of the end of scanning the entire original memory, such row ends, plane ends, and memory ends are given special codes. In one example it is preferred to use special codes that are negative. However these codes could be completely different, e.g. having values that cannot be reached any other way: e.g. 1024, 1025, and 1026 where there are only 512 memory words in a row of memory words in the original memory 4. As an additional constraint, in order to avoid specifying the binary value 1 or 0 of the first voxel on each row, this first voxel is always taken as being empty: in other words it is assumed never to belong to the portion to be displayed of the structure. Since there is no reason why this should always be true, whenever the first voxel does indeed belong to the portion to be displayed of the structure, then the path length given to the arbitrary initial 0 value is itself 0. If the first voxel only on a row is of value 0, then the list corresponding to the row will begin with a path length of 1. If the first two voxels are of value 0, then the first path length will be 2, and so on. However if the first voxel on the row belongs to the structure, then the list corresponding to the row will begin with 0.

Finally, in order to simplify calculation, and in particular in order to avoid calculating coordinates for points in the structure 9 which do not belong to the portion 8, if the last segment of a row is empty (value 0), then it is not represented, in which case the end-of-row code is put into the list immediately instead of the last, not-represented segment.

The list given in FIG. 4 is generated by examining the structure of FIG. 3 and the algorithm of FIG. 5. Processing is applied to x, y, and z lying respectively in the ranges $X_0$ to $X_1$, $Y_0$ to $Y_1$, and $Z_0$ to $Z_1$. Processing begins with a test 25 to see whether z lies in the range $Z_0$-$Z_1$. If true, test 26 then consists in verifying that y lies in the range $Y_0$-$Y_1$. If true, an instruction 27 creates two variables: a variable STATE and another variable LONG. Both of which are initialized to 0. In a test 28, x is checked against the range $X_0$–$X_1$. Initially, when x is equal to $X_0$, this test is true. Thus a test 29 is performed to see whether the binary value 1 of the voxel (initially this is the first voxel 18) to see whether said binary flag value I differs from the value of STATE. For the first voxel 18, its binary value I is not different from the 0 value of STATE since, as can be seen in FIG. 3, a binary value of 0 is stored at this location. Under such circumstances, an instruction 30 increments the value of LONG so that its value increases by unity. The X-coordinate x of the voxel under investigation (18) is also increased to move on to the adjacent voxel: voxel 19. Test 28 is repeated for the adjacent voxel, and where appropriate test 29. These tests are performed for the entire first row, and instruction 30 is performed for each of the voxels 18 to 22. After performing test 29 on voxel 22, the X-coordinate becomes greater than $X_1$. Thus on leaving test 28, an instruction 31 is performed giving the value $-1$ to a variable NLONG representing a new length. This new value is put into the list. This can be seen in FIG. 4 where the list begins with a first value of $-1$. This first value corresponds to row 0. Once a row has been terminated in this way (by a code $-1$), the next row is processed. Instruction 32 increments the Y-coordinate to the next row: $y=y+1$. Processing returns to the beginning of the row by setting x equal to $X_0$.

Row 1 of FIG. 3 is examined using a second series of passes through test 28. After performing instruction 27 and test 28, test 29 shows that the stored binary value I is different from STATE 0 set by instruction 27. As a matter of fact, at the beginning of row 1 in FIG. 3, the first voxel has the value 1. In this case instruction 33 causes the variable NLONG to take the value of the variable LONG. In this case it takes the value 0. Instruction 33 also changes the value of the variable STATE, and LONG is set to $-1$. Since instruction 33 gives a new value (0) to NLONG, 0 is written out to the list of FIG. 4. Thereafter instruction 30 is performed normally.

The voxel situated to the right of the first voxel in row 1 is then tested. Since the value of the variable STATE has been changed, this test 29 is negative. Applying instruction 30 directly now puts the value 2 into the variable LONG. For the voxel in column 2 and row 1, test 29 gives a "yes" outcome because the value of this voxel is 0, whereas the variable STATE contains the value 1. Under such circumstances, a new value NLONG is created equal to the current value of LONG, i.e. to 2. This new value is written out to the list and the value of STATE is changed again. Tests 28 and 29 and instructions 30 and 33 continue to be performed in this way until a new $-1$ value is produced by an instruction 31 after a test 37 to mark the end of row 1.

Test 37 downstream from test 28 evaluates the value of the variable STATE. If STATE is 0, then processing has reached the end of an empty segment which should not be stored, so instruction 31 is performed directly. Otherwise, if STATE is not 0, then processing has reached a full segment and it is necessary to perform an instruction 38 which reproduces the first portion of the instruction 33: NLONG=LONG, i.e. which adds a new value to the list.

Row 2 begins with an empty voxel so it is naturally constituted in the list of FIG. 4 by a value 1 followed by a value 3. The last voxel in row 2 is empty and is thus represented, as explained above, merely by directly outputting the end-of-row code $-1$. The same procedure is applied to row 3. In this case, a positive outcome to test 37 causes instruction 38 to output a value 4. However, a difference can be seen between row 2 and row 3 in that in row 2 there are $1+3$, i.e. 4 voxels to be counted whereas in row 3 there are $1+4$, i.e. 5 voxels to be counted. Using the compacting constraint as specified above, rows are obtained that are not identical in length. Row 4 is represented directly by an end-of-row value $-1$, like row 0.

After scanning row 4, and when producing the value NLONG = $-1$ corresponding to said row, instruction 32 increments the current Y-coordinate to a value greater than $Y_1$. Consequently, the outcome of test 26 is now an instruction 34 which produces a new variable NLONG = $-2$. The value $-2$ means end of plane, or end of memory page. An instruction 35 is then performed during which the current height z is incremented so that z is now equal to $z+1$, and the x and y are reset to values $X_0$ and $Y_0$ respectively. Test 25 is then reperformed as are all the other tests until test 25 in turn gives rise to a negative outcome. Under these circumstances, an instruction 36 produces a last length value of $-3$ for NLONG, thereby marking the end of processing all of the memory words in the original memory 4.

All of the above processing serves merely to replace the sequence of memory words in the original memory 4 by a much shorter list which is stored in the cache memory 7 that is in direct communication with the microprocessor 2. Although this is the preferred way of performing the invention, and although the following description assumes that the above processing has indeed been performed, it is clear that this initial stage is not essential for the invention per se.

The method of the invention consists essentially in building up a "pointer" memory 5 so as to be capable of making use of previously-calculated coordinates in the plane 11 of the positions to which the voxels are projected. This pointer memory also serves subsequently to accelerate finding the physical magnitudes to be displayed. The pointer memory 5 is thus a memory in which memory words P are referenced by addresses u,v. To simplify the explanation, these addresses are taken as being equal to the coordinates of pixels in the plane 11 and on the screen 1. In fact, and in the equivalent manner, these coordinates correspond to addresses in the image memory 70 associated with the display device 1. The data stored in each of the memory words in the pointer memory 5 thus provides two kinds of information. In a first zone this data provides the x,y,z coordinates of the voxels concerned in the portion 8 of the structure 9, or in the equivalent manner on the corresponding addresses in the original memory 4. In another zone, a magnitude w is stored, representative of the projection distance between the voxel concerned and the plane 11. For a given observation direction, the magnitude $w_O$ is the smallest such distance encountered, i.e. the smallest distance to the plane of the screen. It applies to the first visible voxel situated on the surface of the portion 8 in the observation direction.

Figure 6:
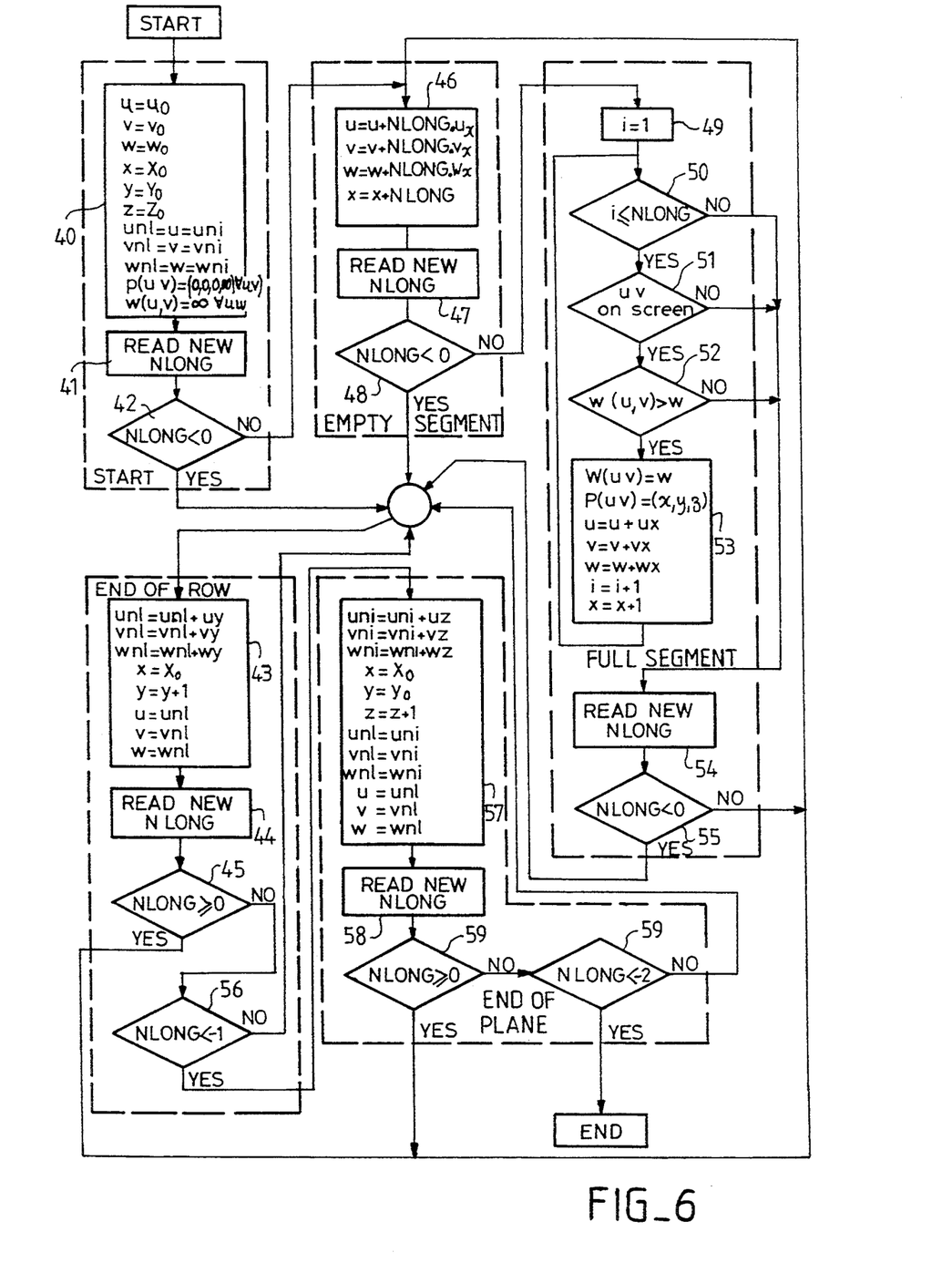
FIG. 6 is a flow chart showing the general algorithm for setting up the pointer memory of the invention, whereby the need to perform multiplications is avoided.

Processing of the invention comprises five different stages given the following titles in FIG. 6: START, EMPTY SEGMENT, FULL SEGMENT, END OF ROW, and END OF PLANE. This processing makes use both of the current coordinates in the screen u,v and of the distance w. Use is also made of coordinates un1, un1, and un1 corresponding to a first point on a current row in screen space. Finally, coordinates uni, vni, and wni are used corresponding to the first point of the first row of the current plane. The method also makes use of the variable NLONG described above and corresponding to successive values in the list of FIG. 4.

Processing of the invention begins by performing an instruction 40 where u, un1 and uni take the value $u_O$, and similarly v, vn1, and vni take the value $v_O$ and w, wn1, and wni take the value $w_O$. This means that the point $u_O$, $v_O$ is considered as being the first point of the first line of the first current image on the screen, and that this point is given a distance of value $w_O$. The values of $u_O$ and $v_O$ may be set by an operator as a function of the framing desired for an image on the screen. These values may be set from the control keyboard or from any other device having the same effect. The value $w_O$ may be set at will as a function of the distance effect that an operator desires to impose on the image to be displayed. In addition, x, y, in and z are caused to take the values $X_0$, $Y_O$, and $Z_O$, an appropriate manner.

By beginning in this way, the following starting constraint has been established:

The original image memory will be scanned or scanning thereof will be stimulated using a scanning mode specific to the memory (cf. generating the memory 5), and the pixels in the plane 11 will be described using an addressing mode induced by the translation and rotation to which the structure 9 is subjected for the purpose of being projected on the plane 11. Reading in the original memory 4 is said to be simulated because it is in fact the list of FIG. 4 that is read from the cache memory 7. In practice, reading the list in the cache memory 7 is nevertheless equivalent to scanning the original memory 4 using a read mode specific thereto.

To begin processing, each pixel P of coordinates u,v in the plane 11 initially contains an address corresponding to the address of the first voxel to be scanned 18. In practice, arrangements can be made for the sacrificed data corresponding to this voxel to represent a luminance level that is very pale (or very dark) so as to have a screen which is initially uniformly white (or black). The screen may alternatively be initialized differently. For example the plane 11 could initially be filled, when beginning the algorithm, with an address that lies outside the field and which will therefore not be read again, while the screen is initially cleared. As for the distance 5, it may be given an initial value of infinity. In practice, it is given an initial value that is very large, e.g. 1024.

Thereafter, in an instruction 41, the first value of the variable NLONG is read. In the list of FIG. 4, this first value is −1. Following instruction 41, there is a test 42 for determining whether this value is negative. This time it is since the value is −1. Consequently the END OF ROW macro-command is performed. This makes sense since −1 does indeed correspond to the end of a row. In an instruction 32 in END OF ROW, x is replaced by $X_0$ and y by y+1. This means that a new row is going to be scanned in the original memory 4 since the previously scanned row was completely empty. The effect of making x take up the value $X_0$, is to return to the beginning of the row. The current values un1, vn1, wn1, and u, v, and w are, however, modified. While remaining at this stage in the same image, it may be observed that the current values uni, vni, and wni are not modified. To modify the value un1, the preceding value un1 is taken and the quantity uy is added thereto. It may be assumed that this corresponds to moving from the first point in the first row of the original memory 4 to the first point in the second row thereof. Consequently x and z are not changed, and only y becomes y+1. By applying the expression given in Table One above, it can be seen that the matrix calculation is equivalent to adding un1 to the quantity uy. Similarly, for vn1, vy must be added, and for wn1, wy must be added. This is expressed algebraically by Table Two below.

Table two u=ux.x+uy.y+uz.z+$u_O$
v=vx.x+vy.y+vz.z+$v_O$
z=zx.x+zy.y+zz.z+$z_O$

For the time being, it is assumed that the values ux, uy, uz, vx, vy, vz, wx, wy, and wz are integers and that no special problems arise in defining a new address in the same manner in the pointer memory 5 and new coordinates in the plane 11. In other words, given that these values have been calculated once and for all, all that is now required is to perform additions. Once instruction 43 has been performed, instruction 44 reads in a new value of NLONG from the list. In this case the second value in the list of FIG. 4 will be read. In a subsequent test 45, this new value of NLONG is compared with 0. Given that this list value is 0, it is considered as being greater than or equal to 0, thus leading to the macro-command EMPTY SEGMENT.

It makes sense to go and execute the macro-command EMPTY SEGMENT since, as specified above, all lines are assumed to begin with an empty segment (unless processing of the entire line is omitted). It may be observed that if the opposite convention were being used, then it would be necessary to go and execute the macro-command FULL SEGMENT. Alteratively, if neither convention were being used, it would now be necessary to perform an additional test to see which of the macro-commands EMPTY SEGMENT and FULL SEGMENT should now be performed. In the present case, given that processing is at the beginning of a segment, instruction 46 specifies that for same y and same z, x becomes equal to x+NLONG and in a corresponding manner u becomes equal to u+NLONG.ux, and so on. In practice, this means that the empty portion of the segment is not processed and that processing goes immediately to observe the following full segment.

It may be observed that this involves multiplications of the type NLONG.ux. However, NLONG can only take on a limited number of values. For example, NLONG is always less than 512 when image resolution is 512 points per row. Since ux or vx or wx can themselves only take a limited number of values (given the possible observation directions) e.g. values in the range 0 to 10, the new current values of u, v, and w can be calculated merely by addressing a memory having a capacity of 5 Kwords (K=1024) likewise loaded in the cache memory. It should be observed, as mentioned at the beginning of the description, that the new row is defined by making use of current values u, v, and w which are already known.

After performing instruction 46, an instruction 47 of the same type as the instruction 44 is performed, i.e. the next value of NLONG is read. In the present case concerning row No. 1, the value 2 is read. This value is compared with 0. Normally, given that an empty segment has just been scanned, it is now necessary to enter a full segment and so the value is normally greater than 0. Under these conditions, the macro-command FULL SEGMENT is performed.

At step 49, this macro-command sets a cycle variable i to the value 1. A test 50 is then performed to see whether i is less than the value of NLONG. In the present case, since 1 is less than 2, a following test 51 sees whether calculated u and v correspond to a point on the screen. If the current viewing direction causes the projection of current u and v to appear as points off the screen 1, then processing relating to this full segment must be stopped. There is no point in trying to display points that are off the screen. Suppose for the moment that the point is still on the screen, a test 52 is then performed on the value of the distance $W(u,v)$. Normally this distance value is set to a very large value. It is specified above as being infinite, or 1024, for example. This very large value given to the point having screen coordinates u,v is compared with the value of w given by Table Two and resulting from projecting the corresponding voxel x,y,z on u,v. If the value w is less than W, then the tested voxel x,y,z is closer to the plane 11. Under such circumstances it is selected. This means that for the corresponding coordinates u,v instruction 53 now sets $W(u,v)=w$.

Then the address x,y,z is stored in word P at address u,v in the pointer memory. In other words an address in the original memory 4 is stored as the information contained in the pointer memory. Once this has been done, two displacements are performed. A first displacement along the current line in the plane 11 by performing the operations $u=u+ux$, $v=v+vx$ and $w=w+wx$. This shows what happens in the current screen row (without changing the projection direction) concerning the effect of projecting the next part of portion 8 in the structure 9. The second displacement is within the portion 8 which is scanned to move onto the next point by performing $x=x+1$. In addition, in order to remain within the same segment, the cyclic variable i is changed, $i=i+1$. A loop is performed back to test 50.

In the present case, given that the value of NLONG in the list was 2, the three tests 50 to 52 are performed again, and for the following point to be tested on the screen, test 50 exits from the macro-command FULL SEGMENT. At this point i=3 which is indeed greater than 2, i.e. it is not less than or equal to 2. Before leaving macro-command FULL SEGMENT, an instruction 54 is performed which consists in reading in a new segment length and in the present case the new value of NLONG will be 1. Given that in this case NLONG is not less than 0 (which means that the end of the row had been reached), macro- command EMPTY SEGMENT is then performed on passing through test 55. The macro-commands FULL SEGMENT and EMPTY SEGMENT thus follow one another alternately. In the macro-command FULL SEGMENT, each current value on the screen is caused to take up the value corresponding to the address in the original memory 4. However, the macro-command EMPTY SEGMENT causes nothing to be done at all other than return as quickly as possible to the macro-command FULL SEGMENT so as to investigate the following full segment.

There comes a moment when the test 55 or the test 48 switches to the macro-command END OF ROW. Processing then moves on to the following row and switching between EMPTY SEGMENT and FULL SEGMENT begins again as before. However, in particular upon reaching the end of a plane, i.e. upon reaching a value of NLONG=−2, the test 45 applied to this value switches to a following test 56 to see if NLONG is less than −1.

It will readily be understood that by selecting negative values for these codes, the corresponding tests are greatly simplified. Under some circumstances it suffices merely to test the sign of the new value of NLONG under test to establish which is the following instruction or macro-command to be performed.

On arriving at END OF PLANE, the END OF PLANE macro-command is performed. In this macro-command, z is increased by one while x and y are initialized, i.e. x is again set to $X_0$ and y is again set to $Y_O$. In addition, the preceding values uni, vni, and wni corresponding to the beginning of the preceding plane are used and added respectively to the values uz, vz, and wz so as to produce new values uni, vni, and wni that are valid for the new current plane. In this new plane, the first current word and the first word of the first current row are defined as being the first voxel of the first row in the new current plane. In practice this means performing $u=un1=uni$, $v=vn1=vni$, $w=wn1=wni$. After performing instruction 57 which is equivalent to performing a shift, a new value of NLONG is read, i.e. the value corresponding to the first NLONG in the following plane. Depending on this new value of NLONG, processing will continue either with the macro-command EMPTY SEGMENT (since rows always begin with an empty segment, even if it is of zero length), or else the macro-command END OF ROW will be performed if the row in question has no voxels belonging to the portion 8 to be displayed of the structure 9. When all of the processing has been completed, a test 59 shows that after an end-of-plane test, the new value of NLONG is less than −2, and this leads to the end of processing.

From the point of view of computation time, the critical portion of the algorithm of the invention lies in the macro-command FULL SEGMENT. The advantage of the present algorithm is firstly that it does not require any access to the data base constituted by the original memory 4 other than reading the value NLONG. Since this value is compressed it is stored in the cache memory. The quantity of high speed memory required in the cache memory is therefore very limited. The central portion of the loop also lends itself very well to being implemented in the form of a specialized circuit, which means that solely for performing the macro-command SEGMENT FULL, it is possible to make a circuit in the form of a special electronic card. This circuit should be used to perform functions 49 to 53.

There now remains the problem of settling two questions: firstly what to do with values of ux, uy, uz, vx, vy, vz, wx, wy, and wz that are not integers; and secondly how to cope with the problem of under-sampling. Non-integer portions are merely ignored. This means that the least significant bits in calculating the new addresses x, v, and w are truncated, i.e. lost. In this way, it may happen that the information stored at a given address u,v in the pointer memory is constituted several times over by different original memory word addresses x,y,z in the original memory 4. The new values then take the position of the old values. In test 51, verifying that u and v are on the screen is equivalent to testing whether the preceding values of u and v are less than U and V respectively that mark the screen boundary.

It is mentioned above that the structure 9 under investigation may be a structure described by a collection of 256×256×88 voxels. In other words this structure does not have the same resolution along a third axis, where for the purposes of simplification, the number of sections acquired in the body is smaller. It can be imagined that the rotations applied to the structure 9 give rise to presenting its length where it has only 88 sections to a nominal dimension on the screen having 256 pixels. This constitutes under-sampling of the pointer memory. In this case, some of the memory words in the pointer memory 5 will be loaded with an address but will be surrounded on either side by memory words having adjacent addresses in which no information has been stored. In practice, such a situation arises if $\sqrt{(ux^2+vx^2)}$, or if $\sqrt{(uy^2+vy^2)}$, or if $\sqrt{(uz^2+vz^2)}$ are less than or equal to one.

In order to avoid this situation, when reading the original memory 4 sequentially in order to create the pointer memory, and when processing compression is being used in conjunction with the cache memory, reading is performed several times over along a selected axis, and in particular along the axis for which there is insufficient resolution. For example, it may be decided that each of the 256×256 planes should be read three times over so as to obtain a total of 3×88=264 sections. Under these conditions, the algorithm of FIG. 6 takes place normally and there is no longer a problem of under-sampling.

In contrast, a problem of over-sampling may also arise if one of the axes X,Y,Z, on which the structure 9 is organized is at a small slope relative to the projection direction W. For example, this applies in FIG. 1, where the Y axis is at a small angle relative to the projection direction. It can then happen that a plurality of voxels in this structure are all projected onto the same point. Instead of performing pointer address calculation for all of such voxels, given that newly stored information overwrites any information previously stored at the same location in the pointer memory 5, it may be decided to iterate with a larger step size. For example, in instruction 53, the instruction i=i+1 may be replaced by an instruction of the type i=i+n where n takes account specifically of the number n of voxels in the structure 9 which project onto the same location in the plane 11. Similarly, the shift x=x+n is applied instead of x=x+1. Depending on which axes of the are concerned, the same procedure is applied to instructions 43 or 57 as the case may be if y is to become y+m and z is to become z+$\frac{1}{2}$.

In addition, the memory 9 may be scanned using a mode different from the scanning mode described above. For example, if the rows are scanned in the following order 14, 24, 70, 71, 72, 73, etc. . . . (see FIG. 1) then the structure is scanned smoothly from front to back. In other words, there is no longer any need to calculate the value w once a memory word in the pointer memory 5 has already been loaded with information concerning an address x,y,z in the original memory 4. Under such circumstances it is certain that any is subsequent voxel to be loaded into the same location is further from the screen. This means that the test 52 can be eliminated. Eliminating the test 52 is equivalent to eliminating an access to the original memory 4 to read the stored G value. Here again, time is saved.

Once the processing of FIG. 6 has been completed, display can be performed normally. Addresses are read from the memory 5 in compliance with the display mode of the screen 1. At each pointer word an address is read of a word in the original memory 4. The information to be displayed is read from this original address. This subsequent processing is thus of the same type as that which occurs in prior-art processing. It is equivalent to defining the contents of an image memory 70 in which each address contains information concerning the measured physical magnitude, the distance w, and the coordinates of the voxel under consideration. In a simplified representation, it is thus possible to represent the value of the physical magnitude, which value is also modulated by the distance w. Shading processing may also be applied taking account either of the gradient of the physical magnitude, or else of the coordinates of the voxels belonging to the surface of the portion 8.

We claim:

1. In a method for displaying a portion of an image of a physical structure on a display screen, including the steps of defining the structure by a plurality of adjacent "voxels", which are volummetric elements, each voxel being representative of (a) a position in three dimensional space; and (b) a value of at least one physical magnitude representative of the structure at the position in space;

storing memory words in an original memory for describing an image of the structure on a screen;

relating an original address to each original memory word;

storing original data in each of the original words;

associating the original addresses of the original words to the position of the voxels in three dimensional space;

associating the original data to the values of physical magnitude; the improvement comprising:

scanning the original addresses of the original memory;

selecting original memory words from the original memory which contain information that corresponds to the portion of the structure to be displayed;

establishing positions on the display screen, calculated from corresponding selected original addresses of original memory words;

relating at least one display magnitude to a corresponding display screen position;

generating the image by displaying a collection display magnitudes at corresponding display screen positions;

creating a pointer memory storing pointer information in pointer words, at corresponding pointer addresses;

associating the address of each pointer word to a position address on the display screen;

associating the information in each pointer word with the original address of an original memory word in the original memory.

2. The method set forth in claim 1 wherein the position address on the screen is calculated by incrementing previously calculated position addresses on the screen.

3. In a method for displaying a portion of an image of a physical structure on a display screen, including the steps of:

defining the structure by a plurality of adjacent "voxels", which are volummetric elements, each voxel being representative of (a) a position in three dimensional space; and (b) a value of at least one physical magnitude representative of the structure at the position in space;

storing memory words in an original memory for describing an image of the structure on a screen;

relating an original address to each original memory word;

storing original data in each of the original words;

associating the original addresses of the original words to the position of the voxels in three dimensional space;

associating the original data to the values of physical magnitude;

the improvement comprising:

scanning the original addresses of the original memory;

selecting original memory words from the original memory which contain information that corresponds to the portion of the structure to be displayed;

establishing positions on the display screen, calculated from corresponding selected original addresses of original memory words;

relating at least one display magnitude to a corresponding display screen position;

generating the image by displaying a collection display magnitudes at corresponding display screen positions;

creating a pointer memory storing pointer information in pointer words, at corresponding pointer addresses;

associating the address of each pointer word to a position address on the display screen;

associating the information in each pointer word with the original address of an original memory word in the original memory;

marking display values on the screen by addressing the pointer words;

reading pointer information contained in each word addressed in the pointer memory, thereby providing the address of the original memory word which provides display data;

reading the data in the original memory word, the address of which is provided by reading pointer information; and determining a display value to be marked on the screen as a function of the original memory word, the address of which is provided by reading the pointer information.

4. In a method for displaying a portion of an image of a physical structure on a display screen, including the steps of:

defining the structure by a plurality of adjacent "voxels", which are volummetric elements, each voxel being representative of (a) a position in three dimensional space; and (b) a value of at least one physical magnitude representative of the structure at the position in space;

storing memory words in an original memory for describing an image of the structure on a screen;

relating an original address to each original memory word;

storing original data in each of the original words;

associating the original addresses of the original words to the position of the voxels in three dimensional space;

associating the original data to the values of physical magnitude;

the improvement comprising:

scanning the original addresses of the original memory;

selecting original memory words from the original memory which contain information that corresponds to the portion of the structure to be displayed;

establishing positions on the display screen, calculated from corresponding selected original addresses of original memory words;

relating at least one display magnitude to a corresponding display screen position;

generating the image by displaying a collection display magnitudes at corresponding display screen positions;

creating a pointer memory storing pointer information in pointer words, at corresponding pointer addresses;

associating, the address of each pointer word to a position address on the display screen;

associating the information in each pointer word with the original address of an original memory word in the original memory;

wherein the creation of the pointer memory's contents further comprises the steps of:

(a) representing, in binary form, each voxel of the structural portion to be displayed;

(b) transforming the binary representation into a path length representation in which similar type sequences of original memory words, that are contiguous during scanning, are replaced by integer indices representing numbers of identical contiguous words in the sequences;

(c) changes from one sequence to the next being represented by two corresponding successive indices;

(d) assigning a first characteristic index to a first level of discontinuity in the original memory scan;

(e) assigning a second characteristic index to a second level of discontinuity in the original memory scan; and (f) equally incrementing previously calculated addresses of positions on the screen by amounts equal to the values of the integer indices.

5. A method according to claim 4, further comprising the steps:

assigning a first character index, during a first level of scanning discontinuity, corresponding to a predetermined type sequence, which is algebraically negative.

6. A method according to claim 4 wherein only the addresses of positions on the screen, corresponding to original memory words of a single type, are calculated.

7. In a method for displaying a portion of an image of a physical structure on a display screen, including the steps of:

defining the structure by a plurality of adjacent "voxels", which are volummetric elements, each voxel being representative of:

(a) a position in three dimensional space; and (b) a value of at least one physical magnitude representative of the structure at the position in space;

storing memory words in an original memory for describing an image of the structure on a screen;

relating an original address to each original memory word;

storing original data in each of the original words;

associating the original addresses of the original words to the position of the voxels in three dimensional space;

associating the original data to the values of physical magnitude;

the improvement comprising:

scanning the original addresses of the original memory;

selecting original memory words from the original memory which contain information that corresponds to the portion of the structure to be displayed;

establishing positions on the display screen, calculated from corresponding selected original addresses of original memory words;

relating at least one display magnitude to a corresponding display screen position;

generating the image by displaying a collection display magnitudes at corresponding display screen positions;

creating a pointer memory storing pointer information in pointer words, at corresponding pointer addresses;

associating the address of each pointer word to a position address on the display screen;

associating the information in each pointer word with the original address of an original memory word in the original memory;

wherein the position address on the screen is calculated by incrementing previously calculated position addresses on the screen; and algebraically adding increments to the previously calculated addresses of positions on the screen, the increments depending on a display direction for the structure portion.

8. In a method for displaying a portion of an image of a physical structure on a display screen, including the steps of:

defining the structure by a plurality of adjacent "voxels", which are volummetric elements, each voxel being representative of (a) a position in three dimensional space; and (b) a value of at least one physical magnitude representative of the structure at the position in space;

storing memory words in an original memory for describing an image of the structure on a screen;

relating an original address to each original memory .word;

storing original data in each of the original words;

associating the original addresses of the original words with the position of the voxels in three dimensional space;

associating the original data with the values of physical magnitude;

the improvement comprising:

scanning the addresses of the original memory;

selecting original memory words from the original memory which contain information that corresponds to the portion of the structure to be displayed;

establishing positions on the display screen, calculated from corresponding selected original addresses of original memory words;

relating at least one display magnitude to a corresponding display screen position;

generating the image by displaying a collection of display magnitudes at corresponding display screen positions;

incrementing original addresses;

updating the calculated display screen position, based on the incremented original address and previously calculated display screen position; and algebraically adding increments of the previously calculated addresses of positions on the screen, the increments depending on a display direction for the structure portion.

* * * * *